United States Patent [19]
Takaishi et al.

[11] Patent Number: 5,570,015
[45] Date of Patent: Oct. 29, 1996

[54] LINEAR POSITIONAL DISPLACEMENT DETECTOR FOR DETECTING LINEAR DISPLACEMENT OF A PERMANENT MAGNET AS A CHANGE IN DIRECTION OF MAGNETIC SENSOR UNIT

[75] Inventors: Tadao Takaishi; Masami Matsumura; Tokuo Marumoto; Masahiro Yokotani, all of Himeji, Japan

[73] Assignee: Mitsubishi Denki Kabushiki Kaisha, Tokyo, Japan

[21] Appl. No.: 357,075

[22] Filed: Dec. 15, 1994

Related U.S. Application Data

[63] Continuation-in-part of Ser. No. 13,086, Feb. 3, 1993, abandoned.

[30] Foreign Application Priority Data

| Feb. 5, 1992 | [JP] | Japan | 4-019871 |
| Feb. 5, 1992 | [JP] | Japan | 4-019873 |
| Jan. 21, 1993 | [JP] | Japan | 5-008087 |

[51] Int. Cl.⁶ .............. G01B 7/14; G01D 5/14; G01R 33/09; F16K 37/00
[52] U.S. Cl. .............. 324/207.21; 137/554; 324/207.22; 324/207.24
[58] Field of Search .............. 324/207.2, 207.21, 324/207.22, 207.24, 252; 338/32 R; 137/553, 554, 556; 123/617

[56] References Cited

U.S. PATENT DOCUMENTS

| 4,107,604 | 8/1978 | Bernier | 324/207.2 |
| 4,492,922 | 1/1985 | Ohkubo | 324/207.21 |
| 4,646,011 | 2/1987 | Wallrafen | 324/207.25 |
| 4,717,873 | 1/1988 | Carr, Jr. et al. | 324/207.16 |
| 5,041,785 | 8/1991 | Bogaerts et al. | 324/207.21 X |
| 5,055,781 | 10/1991 | Sakakibara et al. | 324/207.21 |
| 5,134,371 | 7/1992 | Watanabe et al. | 324/252 |

FOREIGN PATENT DOCUMENTS

| 0145882 | 6/1985 | European Pat. Off. |
| 3148754 | 8/1982 | Germany |
| 4014885 | 11/1990 | Germany |
| 0109209 | 4/1989 | Japan |
| 36089 | 10/1990 | Japan |

OTHER PUBLICATIONS

The Magnetoresistive Sensor, by August Petersen, Electronic Components & Applications, vol. 8, No. 4 1988, pp. 222–239.

*Primary Examiner*—Gerard R. Strecker
*Attorney, Agent, or Firm*—Sughrue, Mion, Zinn, Macpeak & Seas

[57] ABSTRACT

A linear positional displacement detector including a magnetic sensor unit (23) having a magnetic sensing surface formed by a ferromagnetic magnetoresistance element (23a) having a predetermined pattern, and an elongated permanent magnet (22) having a magnetic pole face (22a) at each end. The permanent magnet (22) is movable along its longitudinal axis and magnetically coupled with the magnetic sensor unit (23) with the longitudinal axis positioned on an extended surface of the magnetic sensing surface (23b). A positional displacement of the permanent magnet (22) along the longitudinal axis is detected as a change in the direction of a magnetic flux crossing in parallel the magnetic sensing surface (23b).

1 Claim, 15 Drawing Sheets

F I G. 15
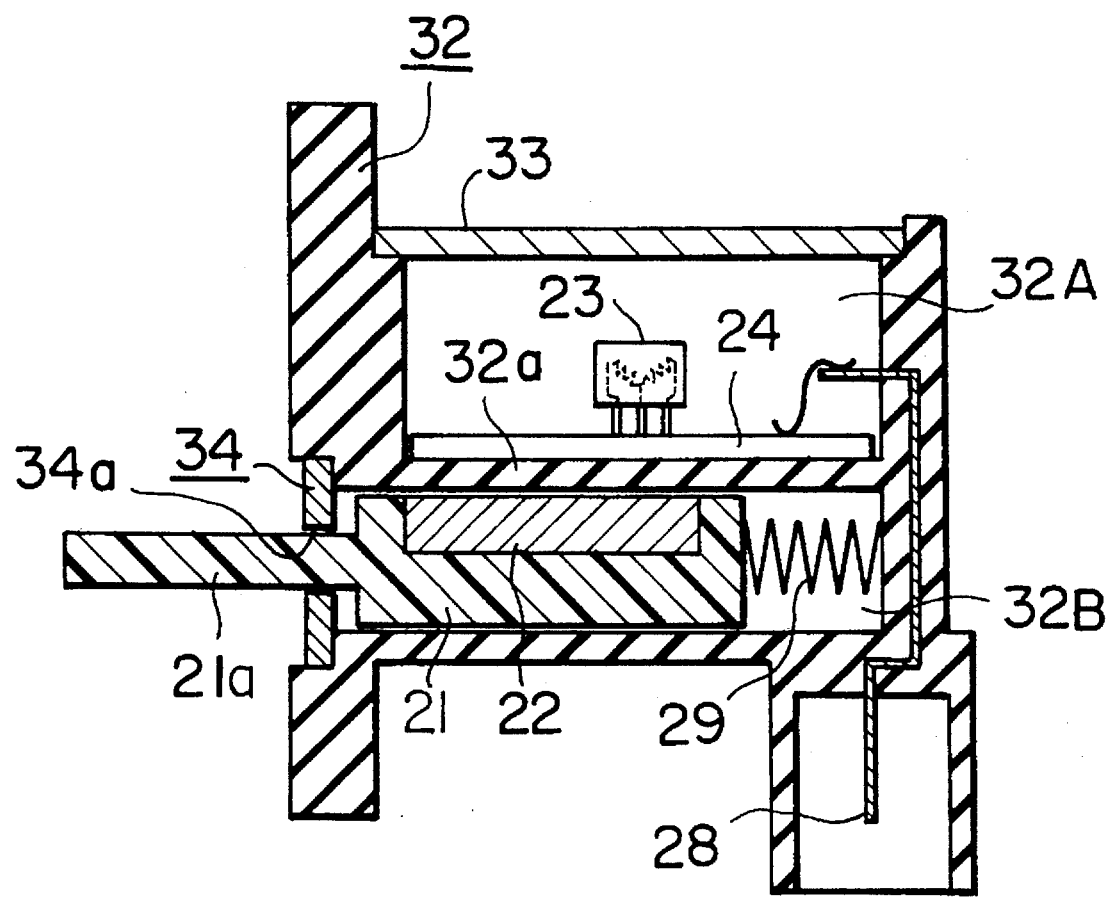

LINEAR POSITIONAL DISPLACEMENT DETECTOR FOR DETECTING LINEAR DISPLACEMENT OF A PERMANENT MAGNET AS A CHANGE IN DIRECTION OF MAGNETIC SENSOR UNIT

This is a continuation-in-part of application No. 08/013,086 filed Feb. 3, 1993, now abandoned.

BACKGROUND OF THE INVENTION

This invention relates to a linear positional displacement detector and, more particularly, to a linear positional displacement detector for detecting a linear displacement of a permanent magnet as a change in direction of magnetic flux on the sensing surface of a magnetic sensor unit.

FIG. 21 is a sectional side view of a conventional linear positional displacement detector disclosed in Japanese Utility Model Laid-Open No. 2-36089 and FIG. 22 is a sectional plan view of the conventional displacement detector illustrated in FIG. 21.

In these Figures, the linear displacement detector comprises a case 1 having end plates 2 having shaft bores 2a into which an elongated shaft rod 3 is slidably inserted and a cover plate 4 fitted in an upper opening of the case 1. In operation, the shaft rod 3 is connected to an apparatus (not shown) whose physical movement is to be detected. The case has mounted on an inner surface of the cover plate 4 a magnetic sensor 7 having a pair of magnetoresistance elements 6a and 6b (FIG. 23) through an electrically insulating plate 5. The case 1 also supports a pair of parallel guide rods 8 at leg portions 4a of the cover plate 4.

Slidably mounted on the guide rods 8 is a slider 9 having a permanent magnet 10 having an elongated and slanted magnetic pole face. The slider 9 is connected to a boss 11 secured to the shaft rod 3 through a substantially U-shaped coupling 12, so that the slider 9 having the permanent magnet 10 is linearly moved along the guide rods 8 when the shaft rod 3 is moved in the axial direction. A compression spring 13 is disposed between the end plate 2 of the case 1 and the boss 11 in order to elastically hold the slider 9 in its home position when no external force is applied to the shaft rod 3.

FIG. 23 illustrates the positional relationship between the magnetoresistance elements 6a and 6b of the magnetic sensor unit 7 and the permanent magnet 10 on the slider 9. The permanent magnet 10 has a magnetic pole face exposed on the upper surface of the slider 9 and the magnetoresistance elements 6a and 6b have their magnetic sensing surfaces exposed in the bottom surface of the sensor unit 7, so that the pole face of the permanent magnet 10 and the magnetic sensing surfaces of the magnetoresistance elements 6a and 6b are positioned in a facing parallel relationship to each other and the permanent magnet 10 is movable relative to the magnetoresistance elements 6a and 6b while maintaining the above-mentioned parallel facing relationship. Also, the permanent magnet 10 is slanted relative to the direction of movement and the magnetoresistance elements 6a and 6b are similarly slanted.

In FIG. 24a, when the permanent magnet 10 is moved in the direction of an arrow A from the illustrated position in which the entire magnetic sensing surface of the first magnetoresistance element 6a faces or overlaps the pole face of the permanent magnet 10, the area or portion of the magnetic sensing surface of the first magnetoresistance element 6a that is in the facing relationship with the permanent magnet 10 gradually decreases and instead the area or portion of the magnetic sensing surface of the second magnetoresistance element 6b that is in facing relationship with the permanent magnet 10 gradually increases.

In FIG. 24b, when the permanent magnet 10 is moved in the direction of an arrow B from the illustrated position in which the entire magnetic sensing surface of the second magnetoresistance element 6b faces or overlaps the pole face of the permanent magnet 10, the area or portion of the magnetic sensing surface of the second magnetoresistance element 6b that is in the facing relationship with the permanent magnet 10 gradually decreases and instead the area or portion of the magnetic sensing surface of the first magnetoresistance element 6a that is in facing relationship with the permanent magnet 10 gradually increases.

Thus, as the permanent magnet 10 makes a linear displacement between the positions shown in FIGS. 24a and 24b, the facing areas of the magnetic sensing surfaces of the first and the second magnetoresistance elements 6a and 6b that are in the facing relationship with the permanent magnet 10 change. This change in the facing area causes a change in the magnetic flux perpendicularly passing through the sensing surface which causes the resistance value of the first and the second magnetoresistance elements 6a and 6b to change. Therefore, by detecting the resistance value of the magnetoresistance elements 6a and 6b, the displacement of the permanent magnet 10 can be detected. In the arrangement illustrated in FIGS. 24a and 24b in which the permanent magnet 10 and the magnetoresistance elements 6a and 6b are slanted by an angle θ with respect to the direction of movement of the magnet 10 and the magnetoresistance elements 6a and 6b have width dimension of L, linear output characteristics can be obtained in so far as the permanent magnet 10 moves within a range or a distance L/sinθ which may be referred to as a linear detection range.

In the conventional linear positional displacement detector as above-described, the linear detection range which is the distance of movement of the permanent magnet 10 over which the linear output characteristics is obtained is relatively large. However, this detection range is sometimes unsatisfactory according to the application and it is desired that a linear positional displacement detector which has a larger linear detection range be developed.

SUMMARY OF THE INVENTION

Accordingly, a chief object of the present invention is to provide a linear positional displacement detector which has linear output characteristics over a wide linear detection range.

Another object of the present invention is to provide a linear positional displacement detector which has a stable linear output by suitably determining the shape of the permanent magnet and the distance between the permanent magnet and the magnetoresistance element.

Still another object of the present invention is to provide a linear positional displacement detector in which a stationary region for housing a circuit board and a movable region for housing a shaft and the permanent magnet are completely isolated so that a hermetic seal is established therebetween.

A further object of the present invention is to provide a linear positional displacement detector in which the permanent magnet is not subjected to an undesirable influence of the surrounding magnetic material.

Another object of the present invention is to provide a linear positional displacement detector in which the circuit trimming suitable in the actual application can be easily carried out and in which assembly efficiency can be improved.

With the above objects in view, the linear positional displacement detector of the present invention comprises a magnetic sensor unit having a magnetic sensing surface formed by a ferromagnetic magnetoresistance element having a predetermined pattern and an elongated permanent magnet having a longitudinal axis and a magnetic pole face at each end thereof. The permanent magnet is movable along the longitudinal axis and disposed in opposition to the magnetic sensor unit with the longitudinal axis positioned in a plane of the magnetic sensing surface. A positional displacement of the permanent magnet along the longitudinal axis is detected as a change in the direction of a magnetic flux crossing the magnetic sensing surface in parallel thereto.

The permanent magnet may be arranged so that the magnetic sensor unit is positioned within a region in which the direction of an equipotential line of the magnetic field from the permanent magnet coincides with the direction of a magnetic field vector. The permanent magnet may have a magnetic pole piece mounted on its magnetic pole faces. The ferromagnetic magnetoresistance element may have a pattern in which a pair of comb-shaped pattern elements are arranged in an angularly rotated, side-by-side relationship.

The shape and distance to the magnetoresistance element of the permanent magnet may be arranged so that a saturated magnetic field is always applied to the ferromagnetic magnetoresistance element. Alternatively, the shape and distance to the magnetoresistance element of the permanent magnet may be arranged so that angular change of the magnetic flux parallelly crossing the magnetic sensing surface of the ferromagnetic magnetoresistance element with respect to longitudinal positional displacement of the permanent magnet is 6±3 deg/mm.

A case member may be provided for completely isolating a first region in which a circuit board including the ferromagnetic magnetoresistance element is disposed from a second region in which a movable shaft having the movable permanent magnet thereon is actuated.

Also, a mounting member may be provided for mounting the linear positional displacement detector to a ferromagnetic member of an apparatus whose physical movement is to be detected by the detector. The ferromagnetic member to which the detector is mounted may have an opening having a central axis, and the mounting member positions the elongated permanent magnet along the central axis of the opening of the ferromagnetic member. Also, a magnetic shield surrounding the elongated permanent magnet in a substantially symmetric, spaced apart relationship may be provided.

Alternatively, the linear positional displacement detector of the present Invention may comprise a case having an opening and a circuit board disposed within the case. A magnetic sensor unit is mounted on the circuit board and has a magnetic sensing surface formed by a ferromagnetic magnetoresistance element having a predetermined pattern. The detector also comprises an elongated permanent magnet longitudinally movably disposed within the case, and a connector assembly connected to the circuit board and closing the opening of the case.

The connector assembly may comprise a guide portion lot allowing a guided movement of the elongated permanent magnet, and the connector assembly may comprise an electromagnetic wave shield box as an integral structure.

BRIEF DESCRIPTION OF THE DRAWINGS

The present invention will become more readily apparent from the following detailed description of the preferred embodiments of the present invention taken in conjunction with the accompanying drawings, in which:

FIG. 15 is a sectional view of the linear positional displacement of the seventh embodiment of the present invention;

FIG. 17 is a sectional view taken along line XVII—XVII of FIG. 16;

DESCRIPTION OF THE PREFERRED EMBODIMENTS

Figure 1:
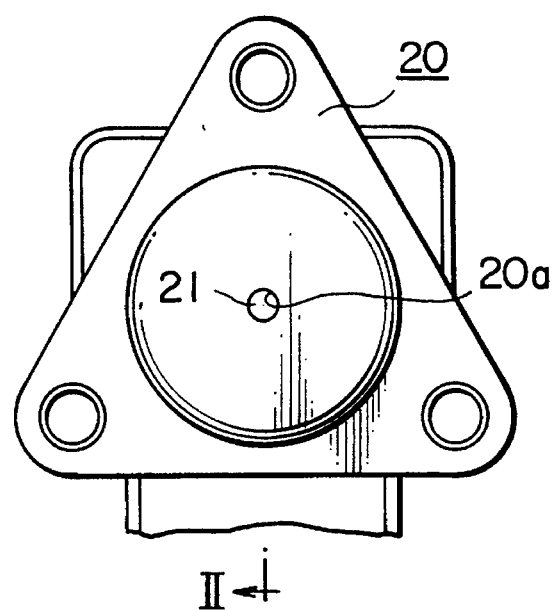
FIG. 1 is a front view of a first embodiment of a linear positional displacement detector of the present invention.

FIGS. 1 to 5 illustrate the linear positional displacement detector of the present invention which comprises a mold case 20 made for example of polybutyleneterephthalate resin and having a closed end with a bore 20a and an open end 20b. A slider 21 supporting an elongated permanent magnet 22 thereon is slidably disposed within the mold case 20 and one end of the slider 21 is a shaft 21a slidably extending through the bore 20a in the closed end of the case 20. The permanent magnet 22 has its magnetic pole faces at the opposite ends and is biased to return to its home position by a compression spring 29 disposed between the slider 21 and the case 20.

Inserted within and closing the open end 20b of the mold case 20 is a connector assembly 25 which comprises a mold plastic assembly main body 25b made for example of polybutyleneterephtalate, a shield box 26 including a cover plate 26a and made of copper and insert-molded within the main body 25b for shielding electromagnetic waves and a magnetic sensor unit 23 mounted on a ceramic circuit board 24. The assembly main body 25b also has integrally formed therein a guide portion 25a for slidably guiding the slider 21 therealong within the case 20 and a connector 25c having terminals 28 with a penetration capacitor 27 for electrically connecting the magnetic sensor unit 23 within the shield box 26 to an unillustrated external circuit. The magnetic sensor unit 23 comprises a magnetoresistance element 23a formed on a glass substrate in a pair of comb-shaped patterns or serpentine patterns. The patterns are combined at right angles to define a magnetic sensing surface 23b. The magnetoresistance element 23a is made of a suitable ferromagnetic magnetoresistance material such as NiFe. The magnetic sensor unit 23 is encapsulated within a rectangular electrically insulating mold resin and is mounted on the circuit board 24 with its magnetic flux sensing surface 23b perpendicularly oriented relative to the circuit board 24.

During assembly of the linear positional displacement detector illustrated in FIGS. 1 to 4, a ceramic circuit board 24 on which the magnetic sensor unit 23 is mounted is attached within the shield box 26 insert-molded in the assembly main body 25b with the cover plate 26a removed from the shield box 26. Then, after closing the shield box 26 by the cover plate 26a, and after installing the slider 21 and the compression spring 29, the shield box 26 and the guide portion 25a of the connector assembly 25 is inserted into and secured to the open end 20b of the mold case 20. When assembled, the slider 21 on which the elongated permanent magnet 22 is mounted is allowed to make a guided liner movement along the shaft 21a and the guide portion 25a, and the permanent magnet 22 is positioned in opposition to the magnetic sensor unit 23 and its longitudinal axis is positioned in a plane of the magnetic flux sensing surface 23b. Therefore, the magnetic field generated from the permanent magnet 22 passes in parallel across the magnetic flux sensing surface 23b of the magnetic sensor unit 23.

In operation, the shaft 21a of the slider 21 is connected to the object (not shown) of which movement is to be detected by the linear positional displacement detector of the present invention. As the object to be detected is moved, the slider 21 is moved against the spring force of the compression spring 29 and along the guide portion 25a of the connector assembly, which causes the permanent magnet 22 mounted on the slider 21 to move in the direction of its elongated axis.

When the permanent magnet 22 moves, the direction of the magnetic flux passing in parallel across the magnetic sensing surface 23b of the magnetic sensor unit 23 varies, which causes the magnetoresistance element 23a to change in the resistance values of the comb-shaped magnetoresistance patterns formed at right angles, providing an output voltage corresponding to the linear displacement of the permanent magnet.

The output voltage from the magnetic sensor unit 23 is amplified and supplied through a terminal 28 to unillustrated external apparatus where the positional displacement of the objected to be detected can be detected.

Figure 6:
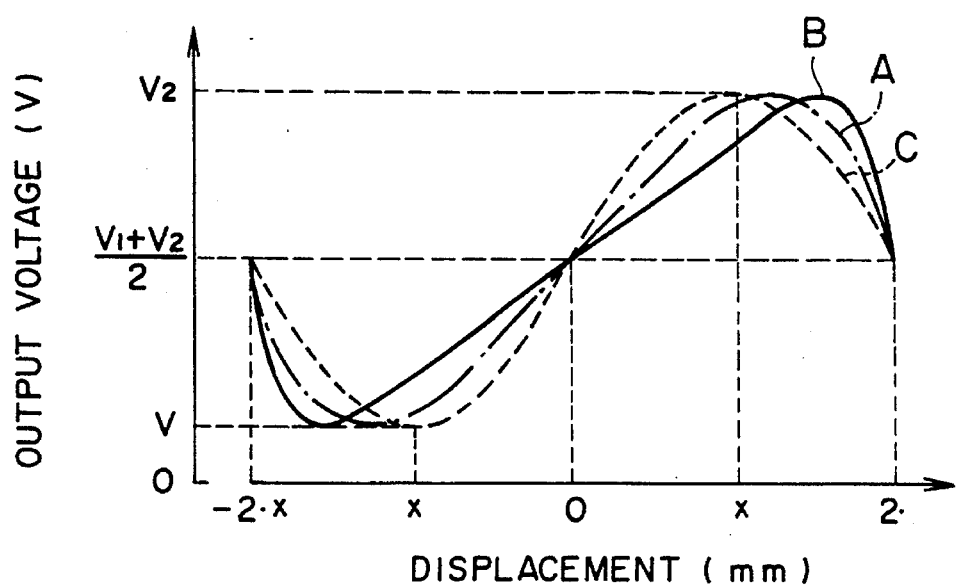
FIG. 6 is a graph showing a relationship between a linear displacement of the permanent magnet and the output voltage of the detector illustrated in FIG. 1.

This output voltage from the magnetic sensor unit 23 is as illustrated in waveform A of FIG. 6 which has a linear output characteristic in a range wider than an output waveform C which is a sine wave.

Also, since the magnetic sensor unit 23 mounted on the ceramic circuit board 24 is surrounded by the shield box 26 including the shield cover 26a, the external electromagnetic waves are shielded so that the circuit element mounted on the ceramic circuit board 24 can be prevented from being erroneously operated.

According to the above-described linear positional displacement detector of the present invention, the elongated permanent magnet 22 is disposed in an opposing relationship with the magnetic sensor unit 23 with its elongated axis in the plane of the magnetic sensing surface 23b of the magnetic sensor unit 23 formed by the magnetoresistance element 23a made of NiFe which is a ferromagnetic magnetoresistive material, so that the range in which the 11near movement of the permanent magnet 22 provides the linear output voltage from the magnetic sensor unit 23 is wider.

Figure 7:
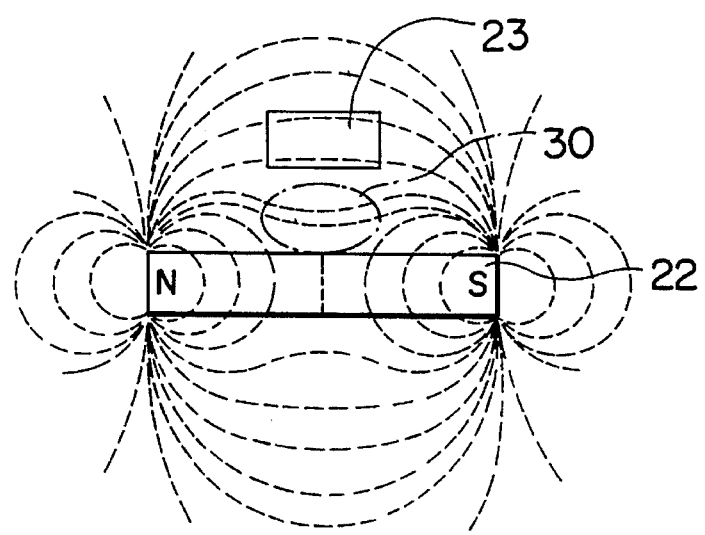
FIG. 7 is a diagram illustrating equipotential distribution of the magnetic field of the linear positional displacement detector of a second embodiment of the present invention.
Figure 8:
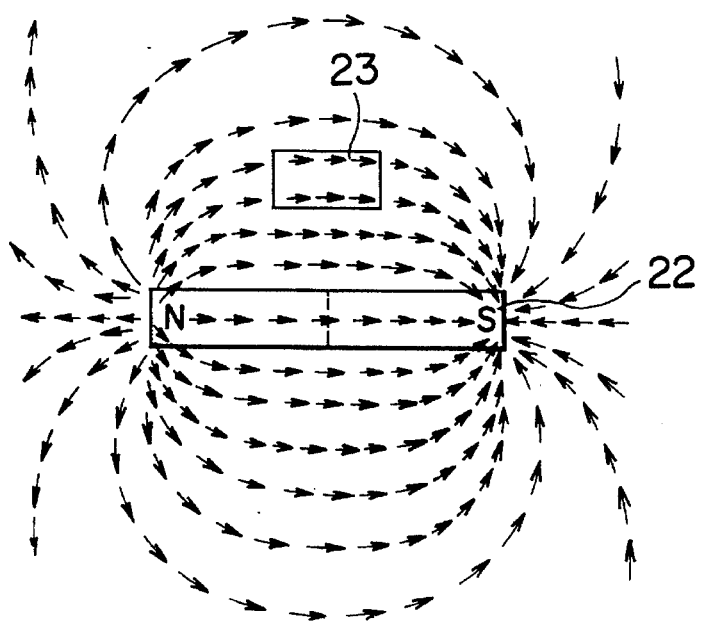
FIG. 8 is a diagram illustrating the magnetic field vector in FIG. 7.

FIG. 7 illustrates the second embodiment of the linear positional displacement detector of the present invention, from which it is seen that the distribution of the magnetic potential of the magnetic field generated from the elongated permanent magnet 22 has a distortion 30 in the vicinity of the central portion of the elongated permanent magnet 22. On the other hand, the magnetic field vector of the permanent magnet 22 can be depicted from the N pole to the S pole as illustrated in FIG. 8. According to the present invention, the magnetic sensor unit 23 is positioned at a position outside the distorted region 30 of the magnetic field potential distribution.

According to this embodiment, since the magnetic sensor unit 23 is located in the area where the equipotential line of the magnetic field of the permanent magnet 22 coincides with the direction of the magnetic field vector which is outside of the distorted region 30 of the magnetic field potential distribution, the undesirable influence of the distortion 30 of the magnetic field potential distribution on the resistance value change of the magnetoresistance element 23a corresponding to the linear displacement of the permanent magnet 22 is suppressed, so that the detection sensitivity of the magnetic sensor unit 23 is increased and the linear displacement range of the elongated permanent magnet 22 along its longitudinal axis over which the output voltage from the magnetic sensor unit 23 is linear can be increased.

Figure 9:
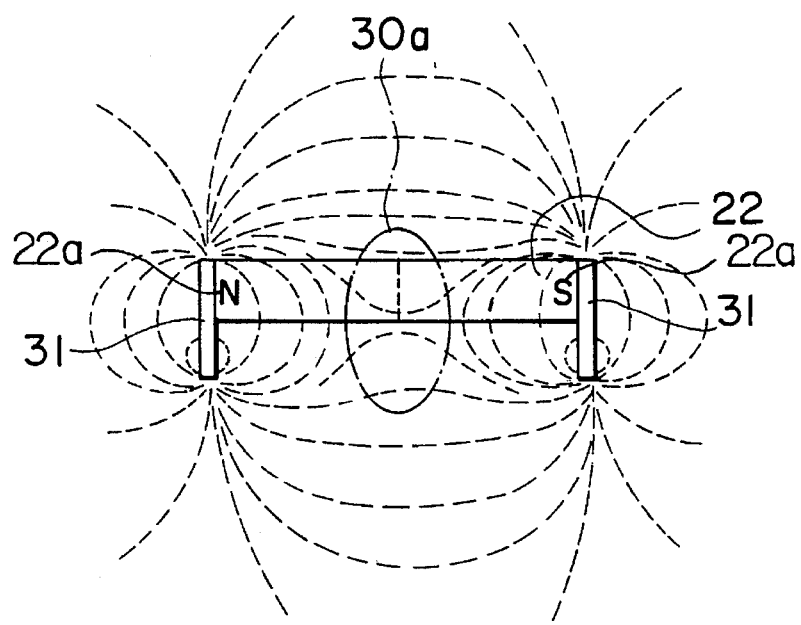
FIG. 9 is a diagram illustrating the equipotential distribution of the magnetic field in the linear positional displacement detector of a third embodiment of the present invention.

FIG. 9 illustrates a magnetic field equipotential distribution of the third embodiment of the present invention in which the elongated permanent magnet 22 is provided at each magnetic pole an iron magnetic piece 31 projecting at one end from the side surface of the permanent magnet 22 as seen from FIG. 9. In this embodiment, the equipotential distribution of the magnetic field generated from the permanent magnet 22 is modified as shown in the figure because of the presence of the magnetic pieces 31 on the pole faces 22a and a distortion region 30a is shifted to be located on the central portion of the permanent magnet 22. The amount of shift of the region 30a depends upon the amount of projection of the magnetic pieces 31 from the permanent magnet 22.

According to this embodiment, the magnetic field equipotential distribution or the configuration of the magnetic field can be controlled by the magnetic pieces 31 so that the magnetic sensor unit 23 can be suitably positioned relative to the permanent magnet 22 and, accordingly, the magnetic sensor unit 23 can be easily positioned by suitably shifting the area where the equipotential line of the magnetic field of the permanent magnet 22 coincides with the direction of the magnetic field vector.

Figure 10:
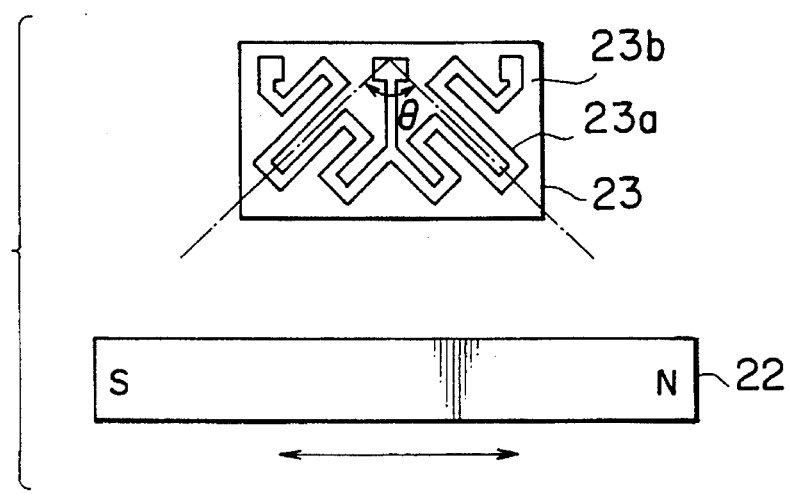
FIG. 10 is a plan view of one example of the magnetoresistance pattern of the magnetic sensor unit of the linear positional displacement detector of the fourth embodiment of the present invention.

FIG. 10 illustrates the fourth embodiment of the present invention in which the ferromagnetic magnetoresistance element 23a of the magnetic sensor unit 23 has a pattern in which a pair of comb-shaped pattern elements are arranged in an angularly rotated, side-by-side relationship. With this magnetic sensor unit 23 having the pattern shown in FIG. 10, the output voltage from the unit 23 is linear over a range wider than that of the first embodiment which uses the sensor unit shown in FIG. 5. When the angle θ defined between the pair of elements 23a is 90°, an output B shown in FIG. 6 which is linear over a wider range of displacement of the permanent magnet can be obtained.

Figure 11:
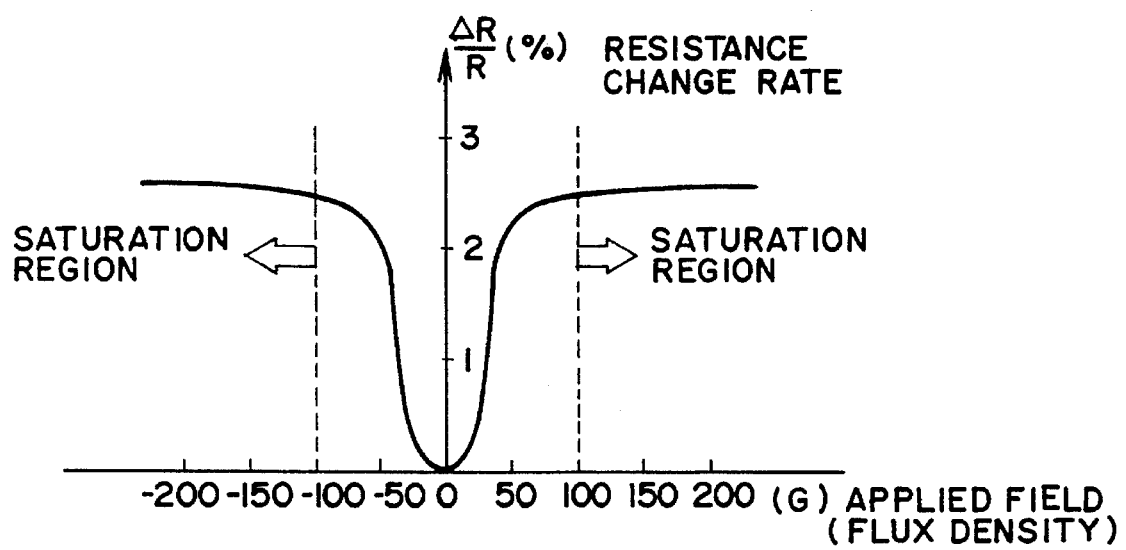
FIG. 11 is a graph showing the applied magnetic field characteristics of the magnetoresistance element of the linear positional displacement detector of the fifth embodiment of the present invention.

FIG. 11 shows the resistance change rate (Δ R/R) of a magnetoresistance element relative to an applied magnetic field. From this graph, it is seen that the resistance change rate is very sensitive to the applied magnetic field change when the applied magnetic field is below 100 G and that the resistance change rate is substantially saturated when the applied magnetic field is above 100 G so that the resistance change rate can be varied only in accordance with the change in the direction of the applied magnetic field. When the applied magnetic field is below 100 G, the resistance change rate is unstable because the resistance change rate varies in accordance with both the strength and the direction of the magnetic field. When the applied magnetic field is over 100 G, the resistance change rate is stable since the resistance change rate varies depending substantially solely upon the direction change of the magnetic field. It is preferable that the magnetic flux density is set equal to or more than 100 G at the central portion of the magnet where the magnetic field applied to the magnetoresistance element is the weakest in order to make the output of the detector stable.

Figure 12:
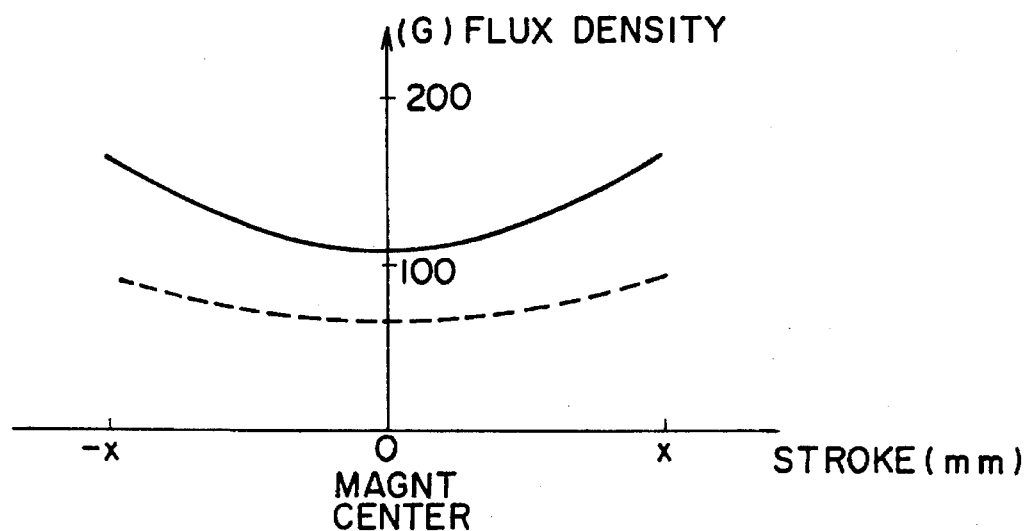
FIG. 12 is a graph illustrating the magnetic flux density with respect to the stroke position in FIG. 11.
Figure 13:
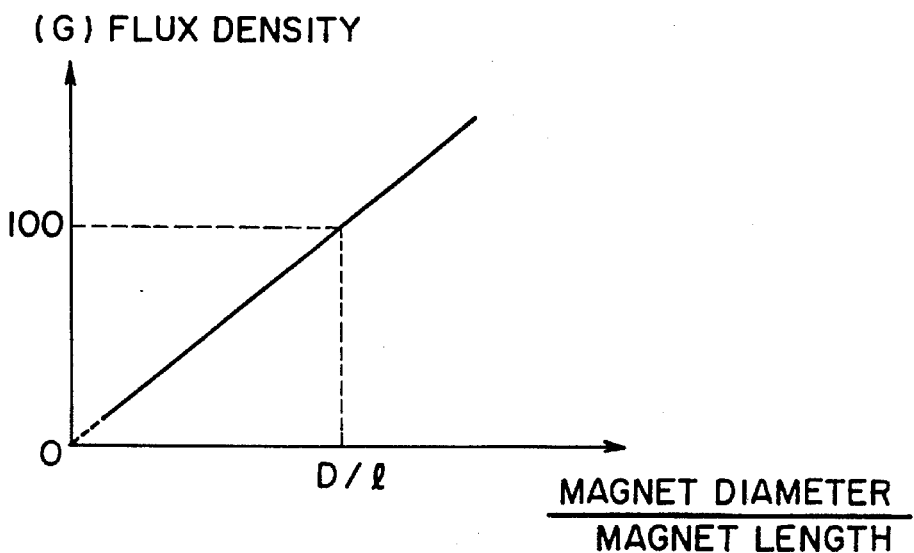
FIG. 13 is a graph illustrating the magnetic flux density with respect to the ratio of the magnet diameter to the magnet length (D/l) in FIG. 11.

Since the magnetic flux density is much influenced by the distance between the magnetoresistance element and the permanent magnet as shown in FIG. 12 and by the ratio of magnet diameter to magnet length (D/l) as shown in FIG. 13, it is necessary to make the distance between the magnetoresistance element and the magnet short and the ratio of diameter to length of the magnet (D/l) above a predetermined value, whereby the output of the linear displacement detector can be made stable. In order to provide an applied magnetic field above 100 G, the magnetic strength of the permanent magnet may be increased.

Preferably, in order to improve the linearity or suppress the undulation of the analogue output voltage from the linear positional displacement detector of the present invention, the ratio of the magnet diameter to the magnet length (D/l) and the distance between the magnetoresistance element and the permanent magnet are determined so that the magnetic flux change per unit stroke of the permanent magnet is 6±3 deg/mm. This 6±3 deg/mm means that the angular change of the magnetic flux is 6°±3° as the permanent magnet moves by 1 mm.

Figure 14:
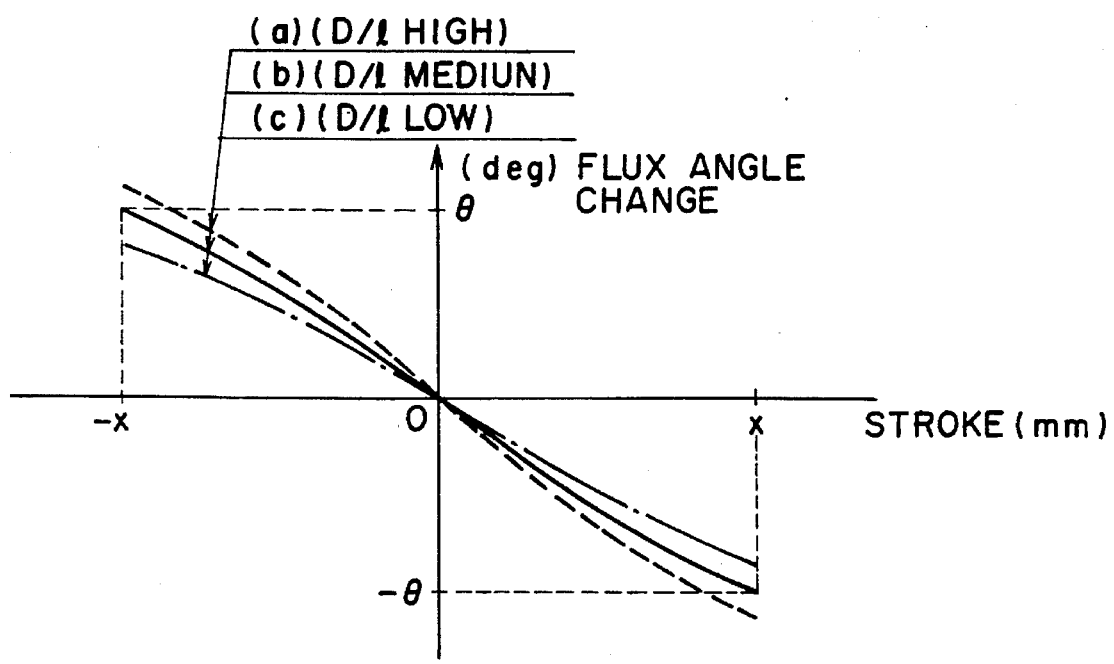
FIG. 14 is a graph illustrating the change in the magnetic flux density with respect to the ratio of the magnet diameter to the magnet length (D/l) in the linear positional displacement detector of the sixth embodiment of the present invention.

FIG. 14 illustrates the relationship of the magnetic flux angle change with respect to the ratio (D/l) of the magnet diameter to the magnet length. Also, as the distance between the magnetoresistance element and the permanent magnet increases, the ratio (D/l) increases and as this distance decreases, the ratio (D/l) decreases. With this arrangement, the linearity of the analogue output voltage from the linear positional displacement detector can be ensured.

In order to obtain a magnetic flux change per unit stroke of the permanent magnet of 6±3 deg/mm, the ratio of magnet diameter to the magnet length (D/l) is determined to be in the range of 0.1 to 0.6. The ratio of magnet diameter to magnet length for the magnetic flux change of 6±3 deg/mm can be determined by the following equation:

$$\theta = -3 \times \left( \frac{0.15 + (D/l)}{0.25} \right) \times X \tag{1}$$

where θ represents the flux angle change and X represents a stroke of the permanent magnet. Solving for D/l, we obtain the following:

$$-\frac{\theta}{X} = 3 \times \left( \frac{0.15 + \left(\frac{D}{l}\right)}{0.25} \right)$$

where $6 - 3 \text{ deg/mm} \leq -\frac{\theta}{X} \leq 6 + 3 \text{ deg/mm}$ then $$6 - 3 \leq \times \left( \frac{0.15 + \left(\frac{D}{l}\right)}{0.25} \right) \leq 6 + 3$$

$$1 \leq \frac{0.15 \left(\frac{D}{l}\right)}{0.25} \leq 3$$

$$0.1 \leq \frac{D}{l} \leq 0.6.$$

The relationship between the flux angle change θ and the stroke X, illustrated in FIG. 14, is determined by the approximate relational expression set forth in equation (1).

It is to be noted that the arrangement described and illustrated in conjunction with FIGS. 11 to 13 and the arrangement just described are very closely related, so that the ratio (D/l) of the magnet diameter to the magnet length and the distance between the magnetoresistance element and the permanent magnet should be selected to satisfy both of the above two arrangements.

FIG. 15 illustrates another embodiment of the linear positional displacement detector of the present invention, in which a detector comprises a case body having a stationary space 32A for the circuit board 24 and an operating space 32B for allowing the movement of the shaft 21a is completely partitioned by a mold wall 32a. The connector 28 is molded and integrally connected to the case body 32. The stationary space 32A of the case body 32 is sealingly closed by an A cover 33 and is bonded to the case body 32 after the circuit board 24 having the magnetoresistance element 23 is disposed within the space 32A. The case body 32 also has secured thereto a B cover 34 for closing the space 32B and having a through hole 34a for the shaft 21a. The B cover 34 is bonded to the case body 32 for preventing the slider 21 from sliding With this arrangement, since the stationary space 32A containing the circuit board 24 is completely isolated from the operating space 32B containing the slider 21 by the mold partition 32a, the moisture, the oil, etc. entering from into the space 32B through the journal hole 34a in the cover 34 along the shaft 21a remain within this space 32B and the pressure fluctuation generated within the operating space 32B remains within this space 32B, so that they do not affect the circuit board 24 in the stationary space 32A, reliably maintaining the hermetic seal of the detector.

FIGS. 16 to 19 illustrate a further embodiment of the linear positional displacement detector of the present invention. In the figures, reference numeral 35 designates a mounting flange integrally formed on the case body 32, 36 is a tubular portion integrally projecting from the mounting flange 35 of the case body 32 and having a central axis 37 along which the elongated permanent magnet 22 on the slider 21 moves. The detector is mounted to a detection object apparatus which is an EGR valve 38 by means of ring-shaped, ferromagnetic mounting flange 38a having an opening 38b. The EGR valve 38 has a negative-pressure chamber 39 to which the negative pressure generated in an engine (not shown) is connected. The shaft portion 21a of the slider 21 is connected to a rod 40 extending from the negative-pressure chamber 39 to a valve 41 for opening the valve 41 in accordance with the negative-pressure within the chamber 39. The slider 21 and the rod 40 are separate members which must be moved together. The spring 29 is a return spring for downwardly biasing the slider 21 to bring it into contact with the rod 40.

Figure 16:
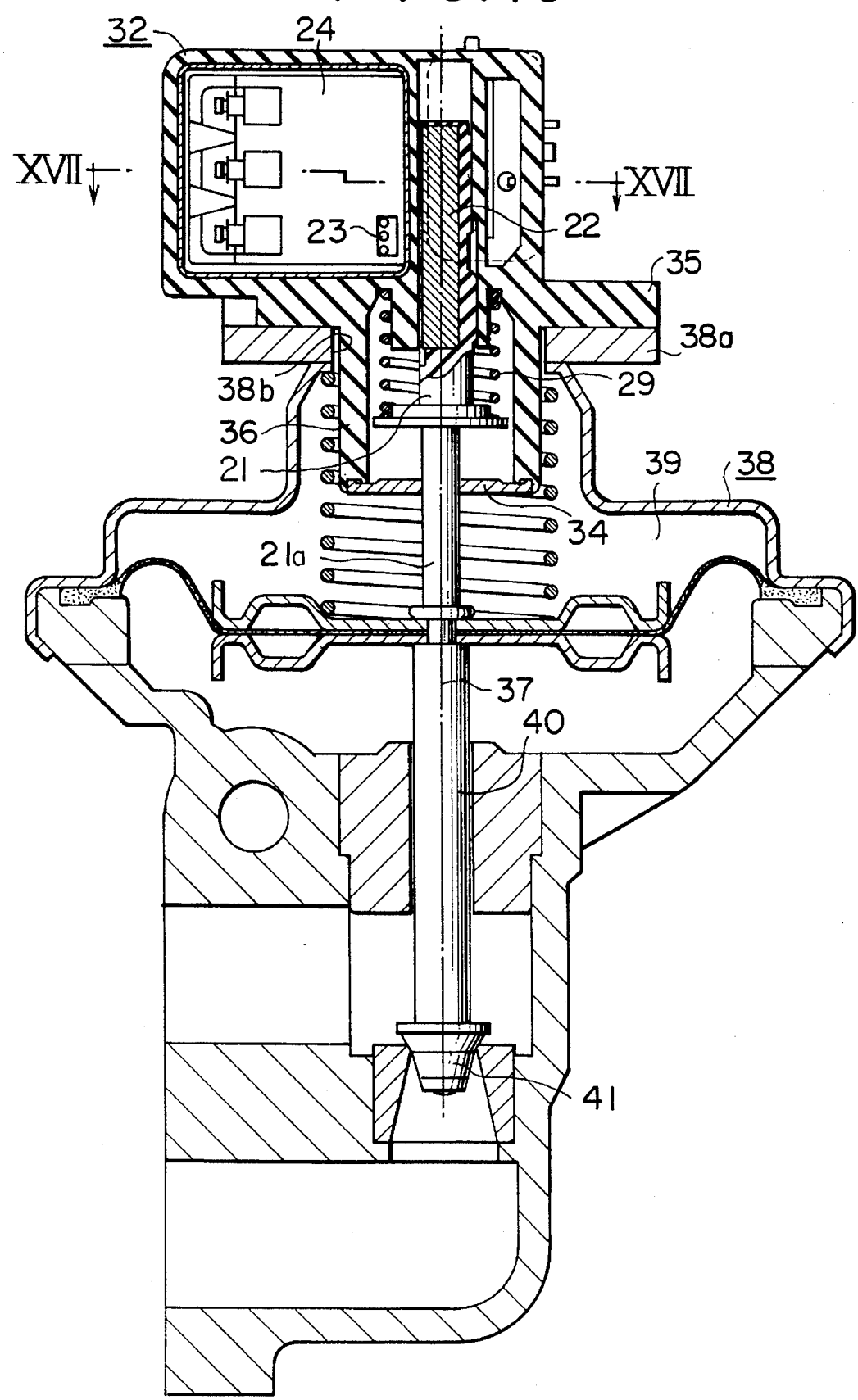
FIG. 16 is a sectional view of the linear positional displacement of the eighth embodiment of the present invention.
Figure 18:
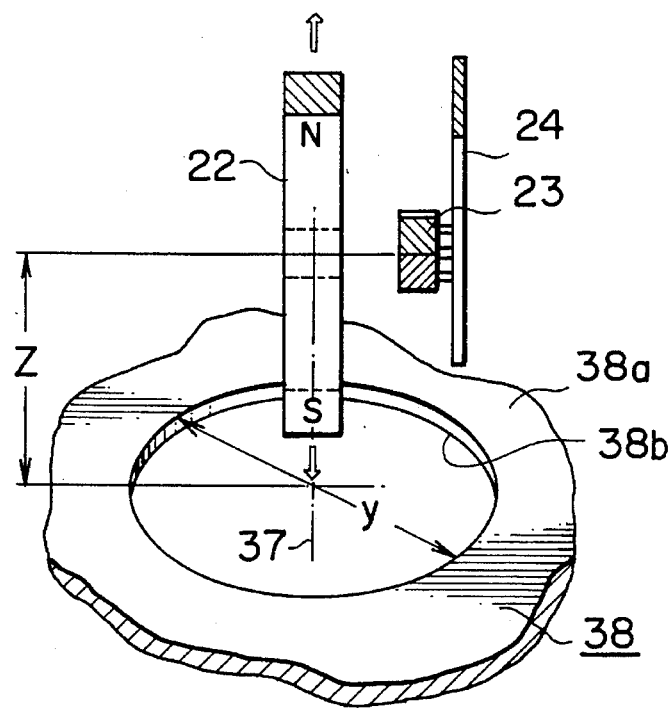
FIG. 18 is a view for explaining the principle of the eighth embodiment of the present invention.

When the linear displacement detector of the present invention is mounted to the EGR valve 38 with the mounting flanges 35 and 38 with the tubular portion 36 inserted into the opening 38b of the flange 38a as illustrated in FIG. 16, the elongated permanent magnet 22 is disposed so that its longitudinal axis coincides with the central axis 37 of the opening 38b of the mounting flange 38a and, therefore, the permanent magnet 22 is movable along the central axis 37 of the opening 38b. Therefore, the magnetic influence of the ferromagnetic mounting flange 38a against the magnetic field generated from the magnet 22 is minimized and the fluctuation of the output voltage from the detector can be minimized.

Figure 19:
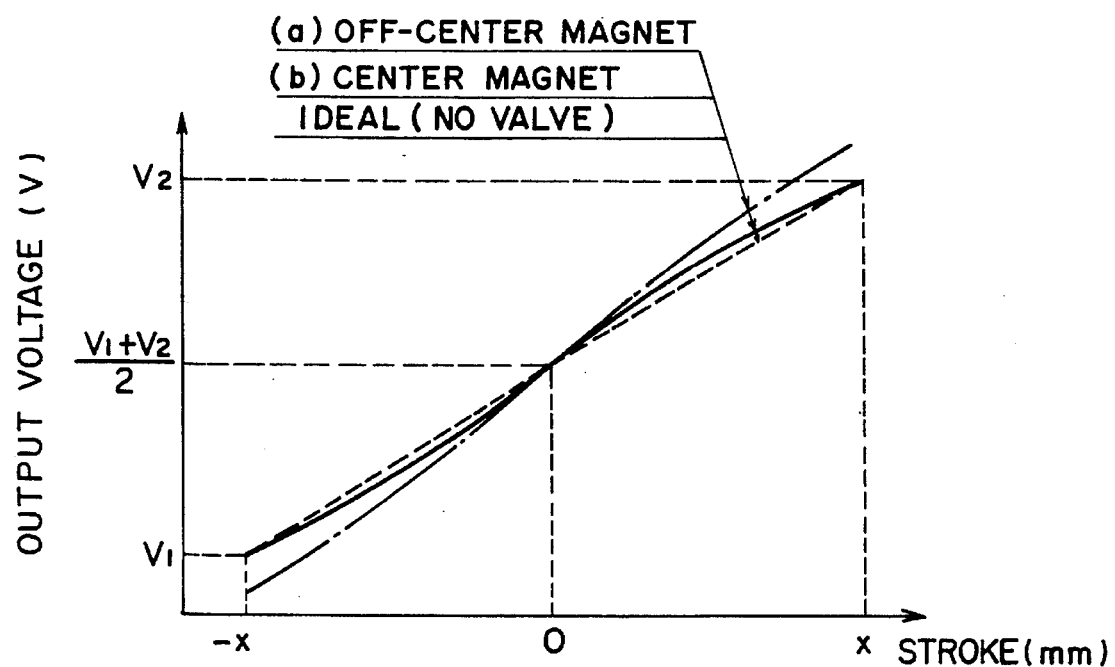
FIG. 19 is a view illustrating the fluctuation of the output voltage in FIG. 18.
Figure 18:
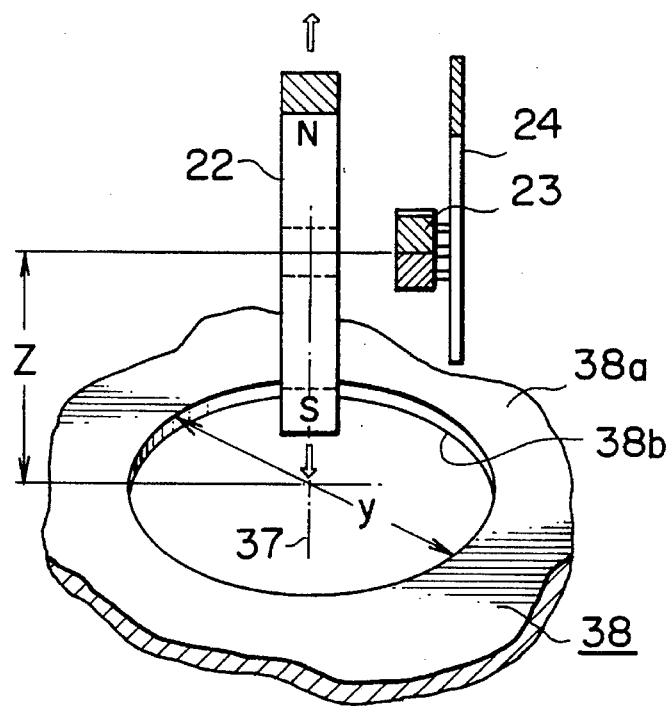
Figure 19:
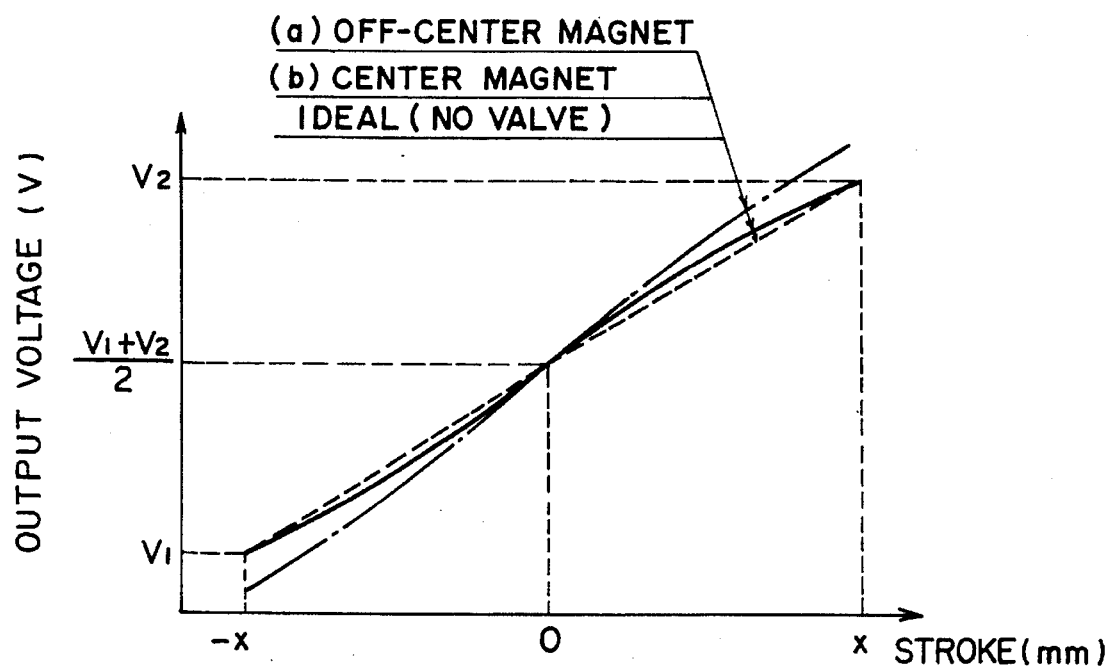

It is of course possible that the distance z in the direction of the central axis 37 between the flange 38a and the center of the permanent magnet 22 and the diameter y of the opening 38b or the horizontal distance between the permanent magnet 22 and the opening 38b be made large to effectively reduce the output fluctuation. However, this is not practical when a detector must be made small. FIG. 19 illustrates one example of an output waveform of the detector shown in FIG. 18 when z=0 and y=constant, from which it is seen that the output fluctuation of the output voltage (a) is large when the permanent magnet 22 is eccentric to the opening 38b and the output fluctuation of the output voltage (b) is small when the permanent magnet 22 is concentric to the opening 38b. The output voltage (c) shown by a dash line is an ideal waveform which is obtained when no valve is used.

The linear positional displacement detector is particularly useful when it is mounted to the EGR valve 38 from which the linear displacement of the rod 40 which moves in response to the negative pressure within the negative-pressure chamber 39 is taken out through the shaft portion 21a of the slider 21 and the change in the direction of the applied magnetic field relative to the magnetoresistance element 23 when the permanent magnet 22 linearly displaces generates an analogue output representing the open degree of the EGR valve 38.

Figure 20:
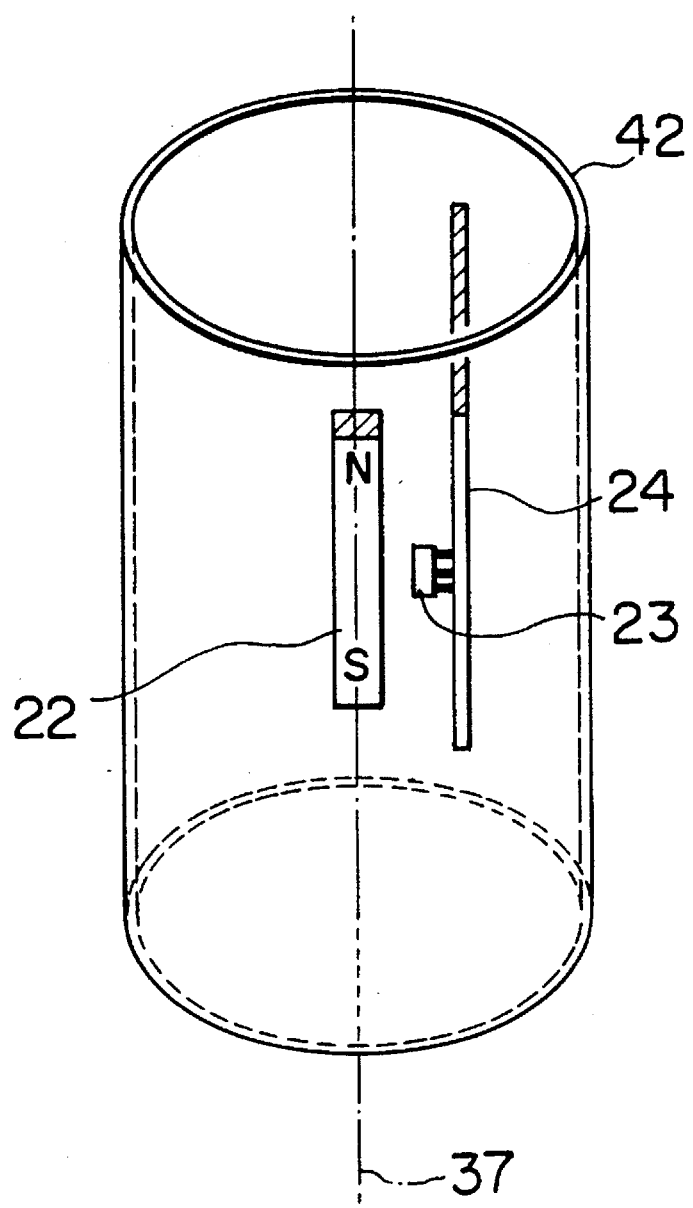
FIG. 20 is a schematic diagram illustrating the linear positional displacement detector of the ninth embodiment of the present invention.
Figure 21:
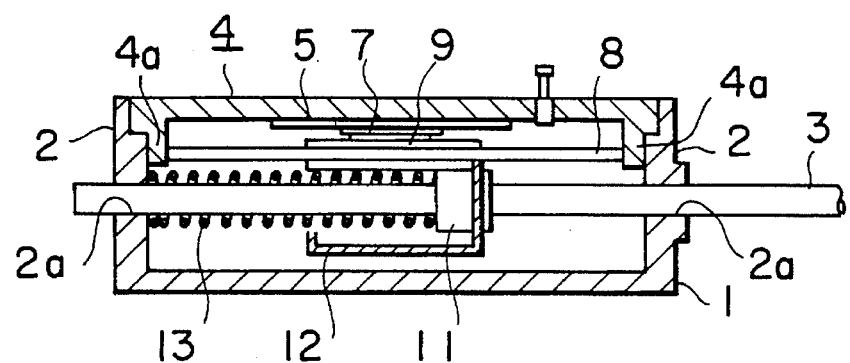
FIG. 21 is a sectional side view of a conventional linear positional displacement detector.
Figure 22:
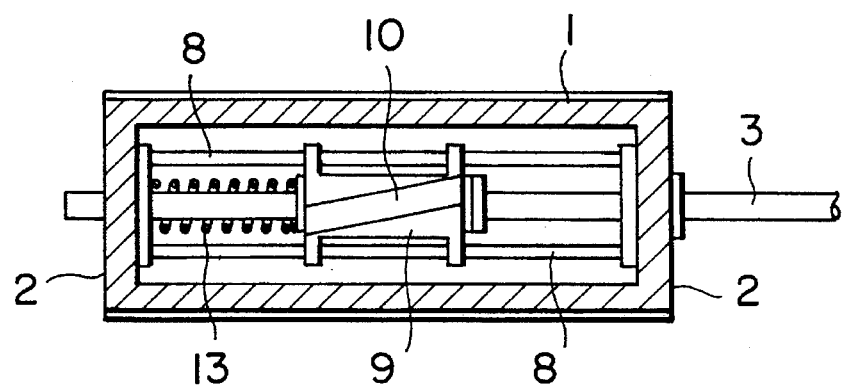
FIG. 22 is a sectional plan view of the conventional linear positional displacement detector illustrated in FIG. 21.
Figure 23:
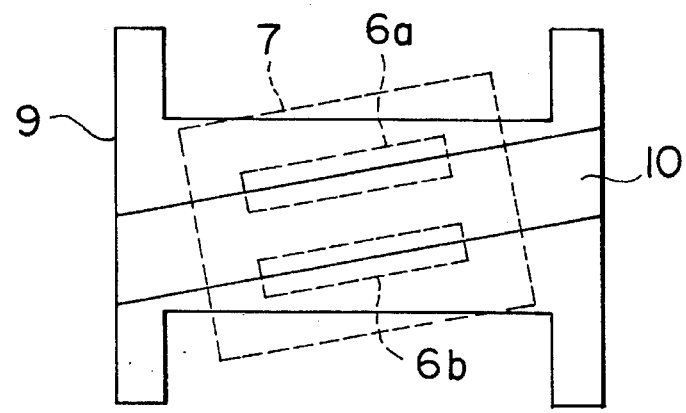
FIG. 23 is a plan view illustrating the arrangement of the permanent magnet in the detector shown An FIG. 21.
Figure 24A:
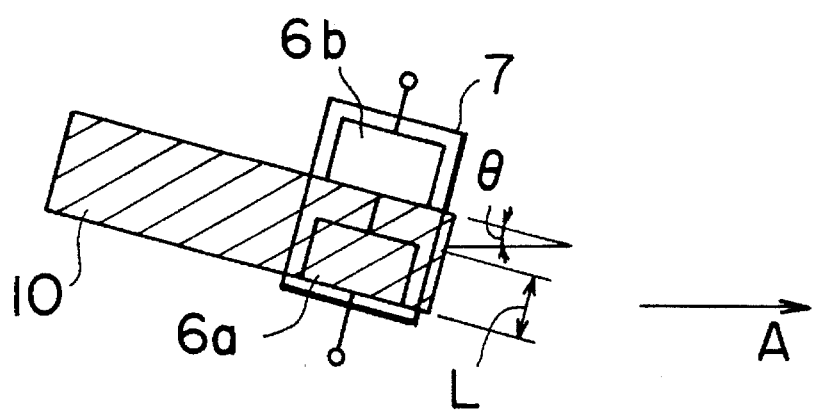
FIGS. 24a and 24b are plan views explaining the operation of the linear positional displacement detector shown in FIG. 21.
Figure 24B:
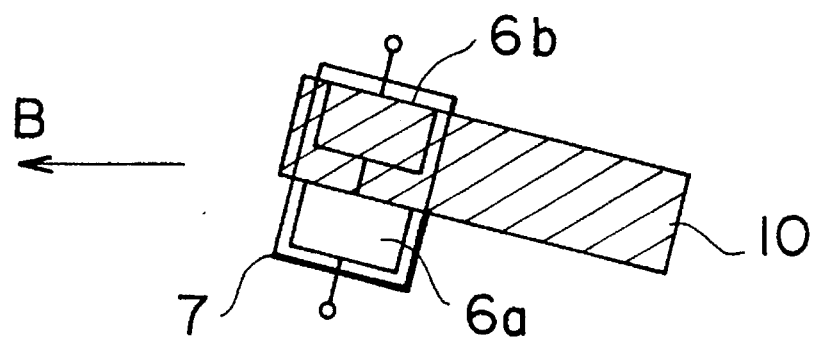

FIG. 20 illustrates one example of the linear positional displacement detector of the present invention, in which a hollow cylindrical magnetic shield 42 made of ferromagnetic material is concentrically disposed around the elongated permanent magnet 22. This magnetic shield 42 is useful in order to completely eliminate the undesirable influence of the external magnetic field end the surrounding magnetic material, such as the mounting flange 38a of the EGR valve 38 shown in FIG. 16 since the permanent magnet 22 is employed. The magnetic shield 42 is effective in minimizing the difference between the output voltage obtained when there is no magnetic shield 42 and the output voltage obtained when the magnetic shield 42 is used, substantially completely eliminating the output fluctuation due to the external magnetic field and the surrounding magnetic material.

Figure 2:
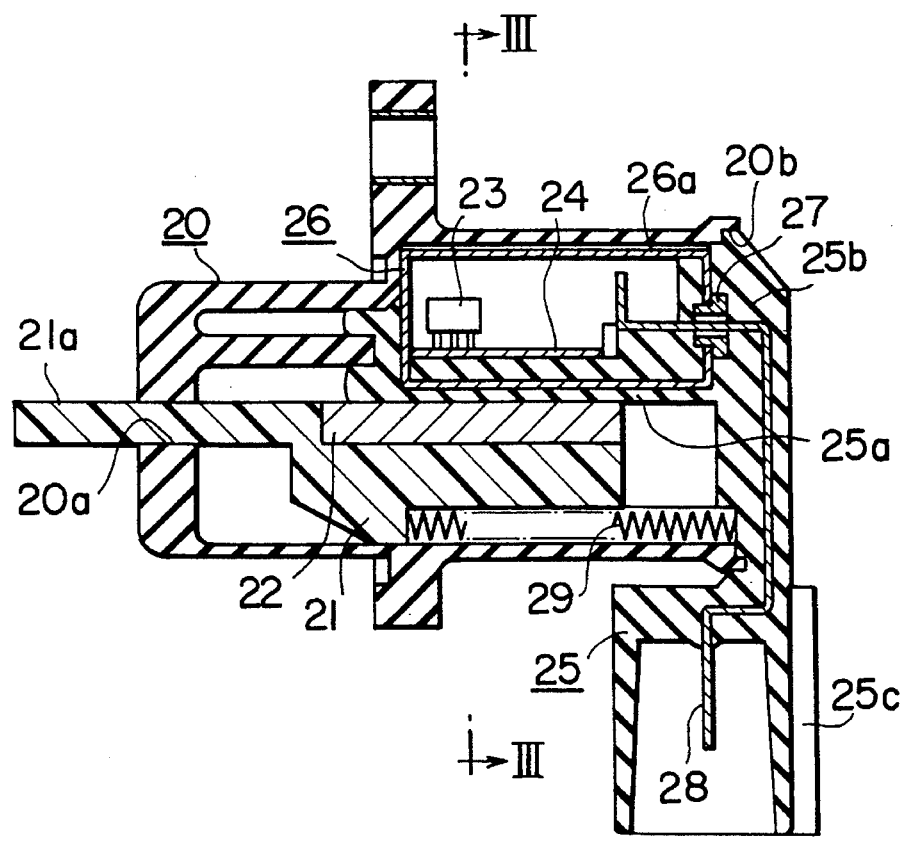
FIG. 2 is a sectional view taken along line II—II of FIG. 1.
Figure 3:
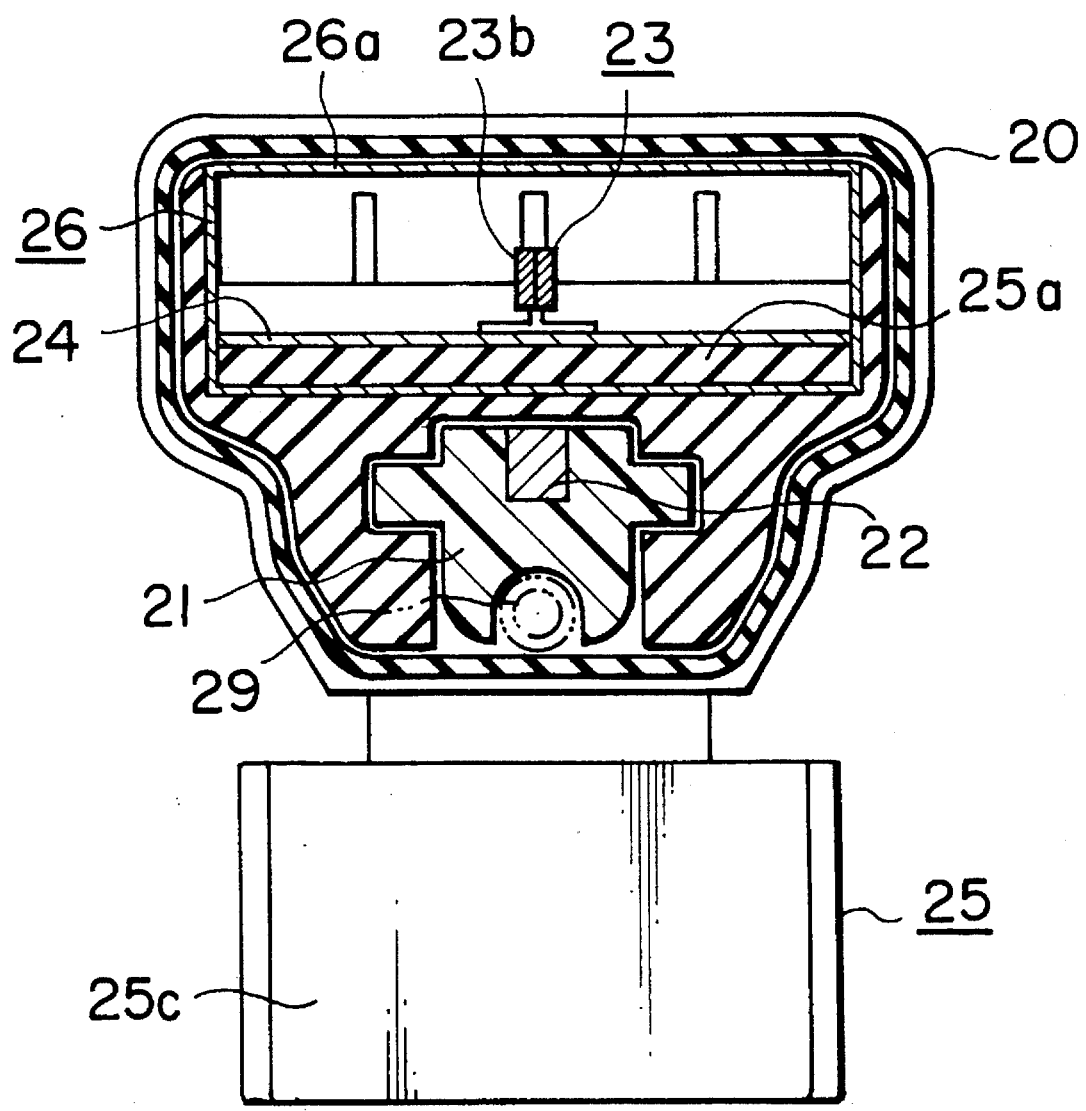
FIG. 3 is a sectional view taken along line III—III of FIG. 2.
Figure 4:
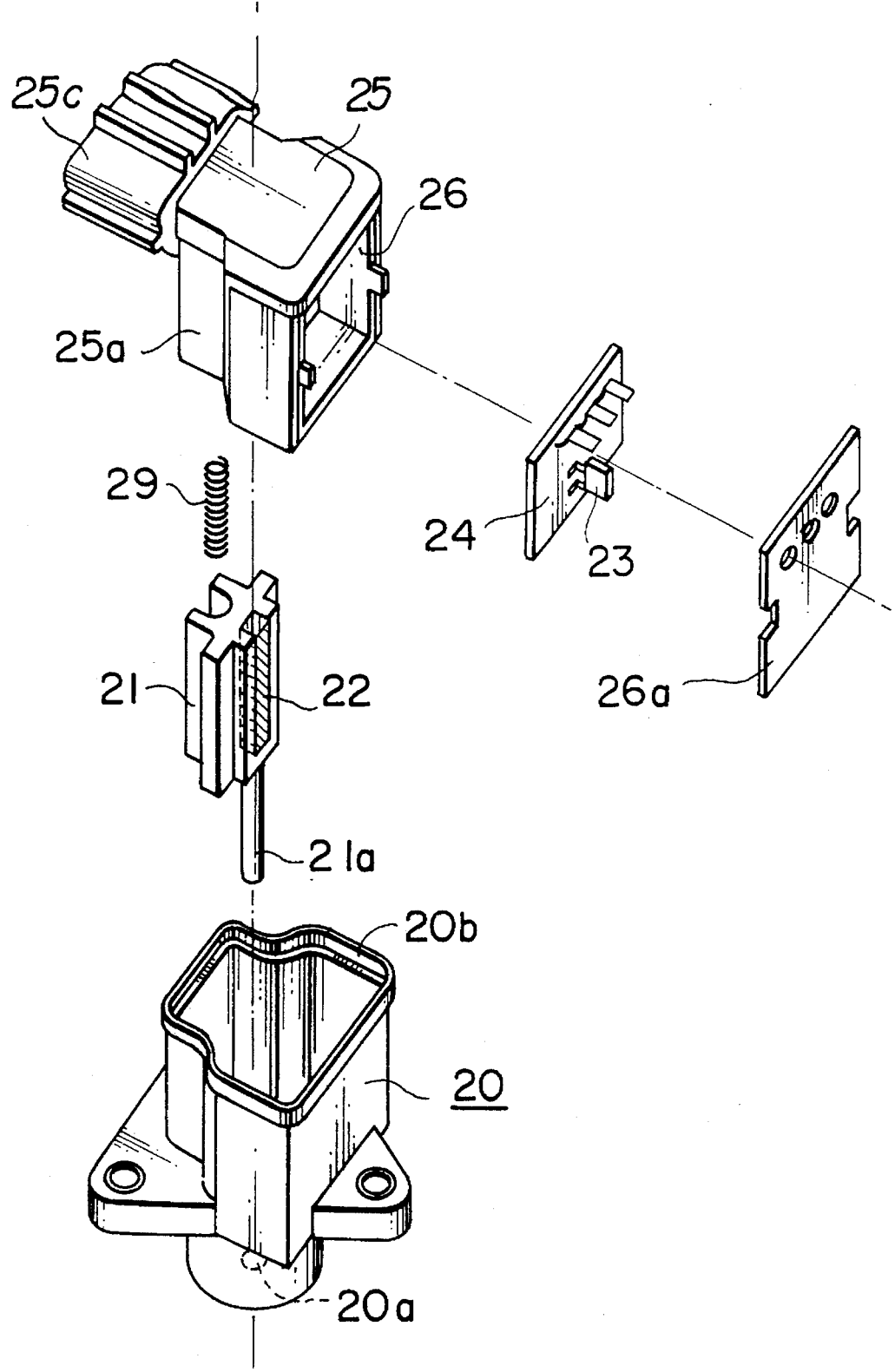
FIG. 4 is an exploded perspective view of the detector illustrated in FIG. 1.
Figure 5:
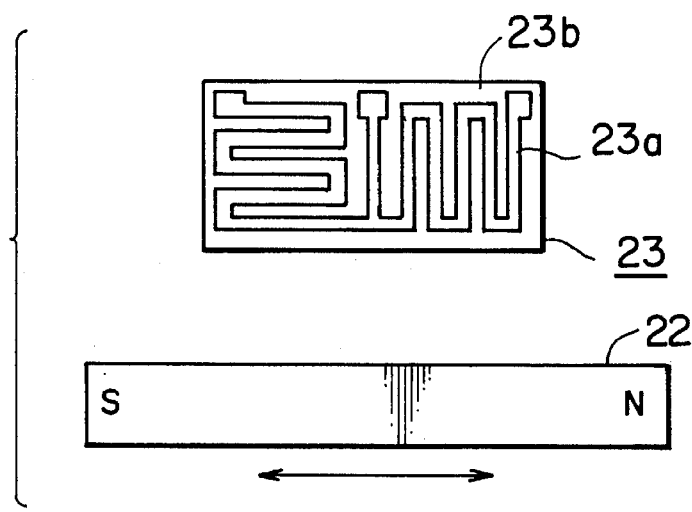
FIG. 5 is a plan view illustrating one example of a magnetoresistance element pattern of the magnetic detector unit illustrated in FIG. 1.

As best illustrated in FIG. 2, the linear positional displacement detector of the present invention comprises a case 20 having an opening 20b, and a connector assembly 25 connected to the circuit board 24 and closing the opening 20b of the case 20, so that the circuit board 24 or the like can be easily assembled in the detector.

Also, connector assembly 25 is provided with the guide portion 25a for slidably guiding the slider 21 having the permanent magnet 22 thereon for allowing a guided movement of the elongated permanent magnet 22. Therefore, in order to trim (adjust) the electronic circuit for desired output characteristics, it is only necessary to insert the permanent magnet 22 into the guide portion 25a of the connector assembly 25 on which the electronic circuit including the magnetoresistance element 23 is mounted and it is not necessary to completely assemble the detector, thus making the trimming operation easy and precise. While the guide portion 25a is explained as being integral part made of the same material as the connector body 25b, the guide portion 25a may equally be made with a suitable bearing material of copper or iron and insert-molded into the connector body 25b.

Also, the connector assembly 25 comprises an electromagnetic wave shield box 26 as an integral structure thereof as best seen from FIG. 2. Therefore, no screws or bonding agent is necessary to assemble the shield box 26 into the detector, so that assembly is easy and efficient. Also, since the shield box 26 is contained within the case 20 without being exposed to the exterior of the case 20, the appearance of the detector is attractive.

As has been described, the linear positional displacement detector of the present invention comprises a magnetic sensor unit having a magnetic sensing surface formed by a ferromagnetic magnetoresistance element having a predetermined pattern, and an elongated permanent magnet having a longitudinal axis and a magnetic pole face at each end thereof, the permanent magnet being movable along the longitudinal axis and disposed in opposition to the magnetic sensor unit with the longitudinal axis positioned in a plane of the magnetic sensing surface, wherein a positional displacement of the permanent magnet along the longitudinal axis is detected as a change in the direction of a magnetic flux crossing the magnetic sensing surface in parallel thereto. Therefore, a linear output can be obtained over a wide range of linear displacement of the permanent magnet in the longitudinal direction.

The permanent magnet is arranged so that the magnetic sensor unit is positioned within a region in which the direction of an equipotential line of the magnetic field from the permanent magnet coincides with the direction of a magnetic field vector. Therefore, the detection sensitivity of the magnetic sensor unit increases and the linear displacement range of the permanent magnet over which the linear output can be obtained becomes wide.

Since the permanent magnet has mounted on the magnetic pole faces thereof a pair of magnetic pieces, so that the adjustment of the positional relationship between the magnetic sensor unit and the magnetic field generated from the permanent magnet can be easy.

Also, the ferromagnetic magnetoresistance element has a pattern in which a pair of comb-shaped pattern elements are arranged in an angularly rotated, side-by-side relationship. Therefore, the detection sensitivity of the magnetic sensor unit increases and the linear displacement range of the permanent magnet over which the linear output can be obtained becomes wide.

The shape and distance to the magnetoresistance element of the permanent magnet are arranged so that a saturated magnetic field is always applied to the ferromagnetic magnetoresistance element, so that a stable output is obtained.

The shape and distance to the magnetoresistance element of the permanent magnet are arranged so that angular change of the magnetic flux parallelly crossing the magnetic sensing surface of the ferromagnetic magnetoresistance element with respect to longitudinal positional displacement of the permanent magnet As 6±3 deg/mm. Therefore a stable linear output can be obtained.

Also, the linear positional displacement detector of the present invention may further comprise a case member which completely isolates a first region in which a circuit board including the ferromagnetic magnetoresistance element is disposed from a second region in which a movable shaft having the movable permanent magnet thereon is actuated, so that a reliable hermetic seal can be established.

The detector may further comprise a mounting member for mounting the linear positional displacement detector to a ferromagnetic member of an apparatus of which physical movement is to be detected by the detector, the ferromagnetic member to which the detector is mounted having an opening having a central axis and the mounting member positioning the elongated permanent magnet along the central axis of the opening of the ferromagnetic member. Therefore, the output fluctuation due to the magnetic influence of the magnetic material around the detector can be minimized.

Also a magnetic shield surrounding the elongated permanent magnet in a substantially symmetric, spaced apart relationship is provided, so that the output fluctuation due to any external magnetic field and surrounding magnetic material can be substantially completely eliminated.

Also according to the present invention, the linear positional displacement detector comprises a case having an opening, a circuit board disposed within the case a magnetic sensor unit mounted on the circuit board and having a magnetic sensing surface formed by a ferromagnetic magnetoresistance element having a predetermined pattern, an elongated permanent magnet longitudinally movably disposed within the case, and a connector assembly connected to the circuit board and closing the opening of the case. Therefore, the detector assembly can be easily achieved.

Also, the connector assembly may comprise a guide portion for allowing a guided movement of the elongated permanent magnet, so that trimming of the electronic sensing circuit can be very easily and precisely achieved.

The connector assembly may comprise an electromagnetic wave shield box as an integral structure, so that assembly is easy and appearance is improved.

What is claimed is:

1. A linear positional placement detector comprising:

a magnetic sensor unit having a magnetic sensing surface formed by a ferromagnetic magnetoresistance element shaped as a pair of serpentine patterns combined at right angles;

an elongated permanent magnet having a longitudinal axis and a magnetic pole face at each end thereof, said permanent magnet being movable along said longitudinal axis and disposed in opposition to said magnetic sensor unit with said longitudinal axis positioned in a plane of said magnetic sensing surface, wherein a positional displacement of said permanent magnet along said longitudinal axis is detected as a change in the direction of a magnetic flux crossing said magnetic sensing surface in parallel thereto; and wherein a diameter to length ratio of said permanent magnet and a distance between said magnetoresistance element and said permanent magnet are arranged so that angular change of the magnetic flux parallel to and crossing the magnetic sensing surface of said ferromagnetic magnetoresistance element with respect to longitudinal positional displacement of said permanent magnet is 6±3 deg/mm, said diameter to length ratio lying in a range from 0.10 to 0.60, and wherein a magnet field strength produced by said permanent magnet is at least 100 G.

* * * * *